United States Patent
Natori et al.

(10) Patent No.: US 12,165,788 B2
(45) Date of Patent: Dec. 10, 2024

(54) INSULATION SHEET AND PRODUCING METHOD THEREFOR, AND ROTARY ELECTRIC MACHINE

(71) Applicant: Mitsubishi Electric Corporation, Tokyo (JP)

(72) Inventors: Shiori Natori, Tokyo (JP); Naoki Yasuda, Tokyo (JP); Kazuya Hasegawa, Tokyo (JP); Kenji Maekawa, Tokyo (JP); Yasuhiro Hayasaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 927 days.

(21) Appl. No.: 17/082,751

(22) Filed: Oct. 28, 2020

(65) Prior Publication Data

US 2021/0183535 A1    Jun. 17, 2021

(30) Foreign Application Priority Data

Dec. 17, 2019   (JP) .................................. 2019-226960

(51) Int. Cl.
*H01B 3/44*   (2006.01)
*H01B 3/30*   (2006.01)
(Continued)

(52) U.S. Cl.
CPC ............... *H01B 3/44* (2013.01); *H01B 3/305* (2013.01); *H01B 3/40* (2013.01); *H01B 3/421* (2013.01);
(Continued)

(58) Field of Classification Search
None
See application file for complete search history.

(56) References Cited

U.S. PATENT DOCUMENTS

| | | | |
|---|---|---|---|
| 5,984,647 A | 11/1999 | Miyamoto et al. | |
| 2011/0291300 A1* | 12/2011 | Hirano | H01L 23/293 |
| | | | 428/354 |

(Continued)

FOREIGN PATENT DOCUMENTS

| | | | | |
|---|---|---|---|---|
| CN | 110154485 A | * | 8/2019 | ............. B32B 27/06 |
| JP | 10-285886 A | | 10/1998 | |

(Continued)

OTHER PUBLICATIONS

Machine translation of JP 2016017079 A, retrieved Oct. 2023. (Year: 2023).*

(Continued)

*Primary Examiner* — Nicole M. Buie-Hatcher
(74) *Attorney, Agent, or Firm* — Sughrue Mion, PLLC; Richard C. Turner

(57) ABSTRACT

In the insulation sheet, an insulation resin layer made of a thermosetting resin composition in an uncured or semi-cured state is formed on one or each of both surfaces of the base material. The thermosetting resin composition contains: a thermosetting resin (A) that is in solid form at 25° C.; a thermosetting resin (B) that is in liquid form at 25° C.; a latent curing agent that is unreactive at 60° C. or lower; and an inorganic filler having a maximum particle diameter smaller than a film thickness of the insulation resin layer and having an average particle diameter smaller than 0.5 times the film thickness. The insulation resin layer of the insulation sheet is efficiently compressed into a predetermined thickness by pressure application at normal temperature and permeates a gap between a stator core and a stator coil by heating during curing treatment, whereby both members can be insulated and fixed.

16 Claims, 6 Drawing Sheets

(51) Int. Cl.
    *H01B 3/40*     (2006.01)
    *H01B 3/42*     (2006.01)
    *H01B 19/00*     (2006.01)
    *H02K 3/30*     (2006.01)
    *H02K 3/34*     (2006.01)
    *H02K 15/10*     (2006.01)

(52) U.S. Cl.
    CPC ............... *H01B 19/00* (2013.01); *H02K 3/30* (2013.01); *H02K 3/345* (2013.01); *H02K 15/10* (2013.01)

(56) References Cited

U.S. PATENT DOCUMENTS

2017/0278820 A1*   9/2017   Shinohara ............... H01L 24/73
2018/0134926 A1*   5/2018   Lei ............................ C09J 7/29
2019/0149005 A1     5/2019   Yamaguchi et al.

FOREIGN PATENT DOCUMENTS

| JP | 2000-044636 A | | 2/2000 |
|----|---------------|---|--------|
| JP | 2005133055 A | * | 5/2005 |
| JP | 5157296 B2 | | 3/2013 |
| JP | 2016017079 A | * | 2/2016 |
| JP | 2019-092250 A | | 6/2019 |

OTHER PUBLICATIONS

Machine translation of CN 110154485 A, retrieved Mar. 2024 (Year: 2024).*

Machine translation of JP 2005133055 A, retrieved Aug. 2024 (Year: 2024).*

* cited by examiner

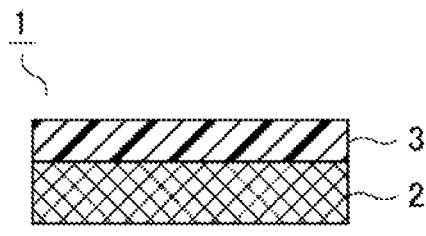
FIG. 1A
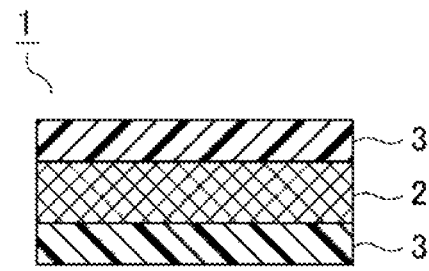
FIG. 1B
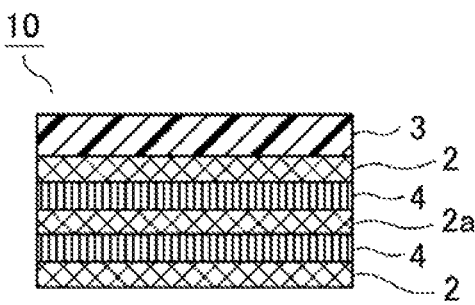
FIG. 2A
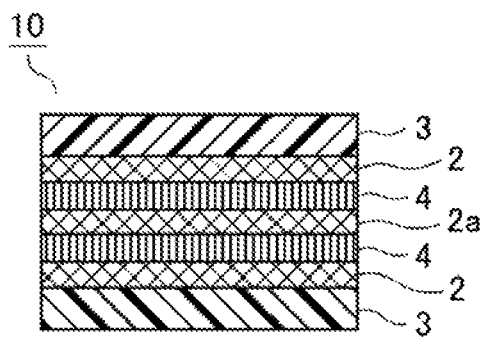
FIG. 2B
FIG. 3
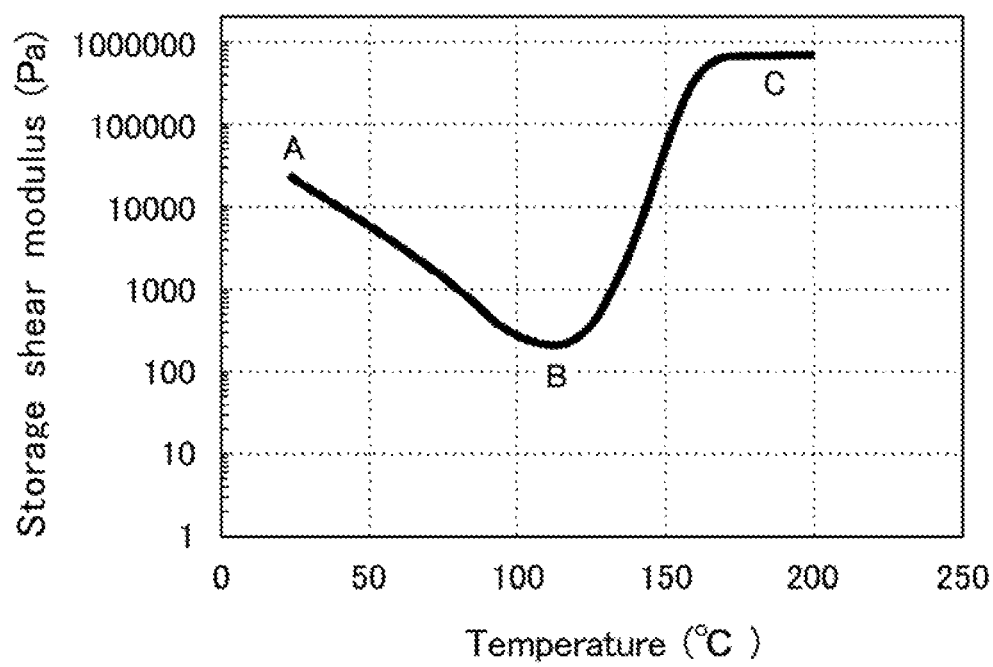

INSULATION SHEET AND PRODUCING METHOD THEREFOR, AND ROTARY ELECTRIC MACHINE

BACKGROUND OF THE INVENTION

Field of the Invention

The present disclosure relates to an insulation sheet and a producing method therefor, and a rotary electric machine.

Description of the Background Art

Insulation materials having excellent insulation properties, heat resistance, and thermal dissipation properties have been required to be used for rotary electric machines including electric motors, power generators, compressors, and the like in association with size reduction and output increase thereof. In a case where an insulation material is disposed in a gap between members to be insulated, e.g., a stator core and a coil, if an air space partially remains, the air space causes deterioration of insulation properties, thermal dissipation properties, and vibration resistance. Conventionally, when a coil is accommodated in a slot of a stator core, an insulation paper sheet is inserted in a gap between the coil and the inner wall of the slot, and the coil is impregnated with a liquid insulation varnish.

However, the gaps for the inner wall of the slot, the coil, and the insulation paper sheet are narrowed in association with increase in the space factor of stator windings, whereby a problem arises in that the insulation varnish does not sufficiently permeate and partial fixation occurs. Meanwhile, if a low-viscosity varnish is used for improving permeability, much of the varnish dropped onto a coil end leaks out to an end surface of a core portion, and the amount of adhesion inside the coil becomes insufficient. As a result of these drawbacks, coil fixation performance decreases, whereby the long-term insulation reliability of the rotary electric machine is adversely influenced. In particular, in the case of a rotary electric machine for an automobile, decrease in the coil fixation performance is a factor in deterioration of noise, vibration, and harshness (hereinafter, referred to as "NVH properties") which are one type of measure for inferring the comfort in the automobile.

Furthermore, the temperature of heat generated from the stator windings tends to increase in association with the output increase. Thus, from the viewpoint of the durability of the rotary electric machine, the thermal dissipation performance thereof needs to be improved. However, if an insulation varnish has not sufficiently adhered between coils and an air space is formed, heat from the coils cannot be efficiently dissipated to the core.

Patent Document 1 proposes a method for fixing, in an insulating manner, a coil to a stator core without impregnating the coil with an insulation varnish. In this conventional technique, an insulation film base material, on both surfaces of which thermosetting resins in a semi-cured state are stacked, is used, and insulation fixation resins resulting from curing the thermosetting resins in a semi-cured state are packed between the insulation film base material and the coil and between the insulation film base material and the inner wall of a slot.

Patent Document 1: Japanese Patent No. 5157296

In the above-described Patent Document 1, each thermosetting resin in a semi-cured state is formed from an epoxy resin or the like, and the insulation film base material is formed from a resin such as polyethylene naphthalate, polyethylene terephthalate, or a polyimide. However, the compositions and the physical properties thereof are not described in detail at all. In addition, no evaluation was performed regarding flexibility and fluidity properties of the thermosetting resin, and it is unclear whether the thermosetting resin has a characteristic of flowing at the time of heating to permeate a narrow space between the members.

In addition, in the above-described Patent Document 1, although the thickness of the thermosetting resin is set to be larger than the thickness of the insulation film base material in order to fill a gap between the coil and the core of the rotary electric machine, the total thickness of the insulation sheet is not specified. If the total thickness of the insulation sheet is larger than the dimension of the gap between the coil and the core, work of inserting the coil into the slot may become difficult to perform.

SUMMARY OF THE INVENTION

The present disclosure discloses a technology for solving the above-described problems, and an object of the present disclosure is to provide: an insulation sheet capable of filling a gap between members to be insulated, and insulating and fixing both members; and a producing method for the insulation sheet. Another object of the present disclosure is to realize size reduction and output increase of a rotary electric machine by improving insulation reliability, thermal dissipation properties, and vibration resistance with use of the above-described insulation sheet.

An insulation sheet according to the present disclosure is an insulation sheet in which one or each of an insulation paper sheet and an insulation film is used as a base material, and an insulation resin layer made of a thermosetting resin composition in an uncured or semi-cured state is formed on one or each of both surfaces of the base material. The thermosetting resin composition contains: a thermosetting resin (A) that is in solid form at 25° C.; a thermosetting resin (B) that is in liquid form at 25° C.; a latent curing agent that is unreactive at 60° C. or lower; and an inorganic filler having a maximum particle diameter smaller than a film thickness of the insulation resin layer and having an average particle diameter smaller than 0.5 times the film thickness. An amount of the thermosetting resin (A) per a total of 100 parts by mass of the thermosetting resin (A) and the thermosetting resin (B) is in a range of 30 parts by mass to 70 parts by mass.

A rotary electric machine according to the present disclosure is a rotary electric machine in which the insulation sheet according to the present disclosure is used, and a stator coil is accommodated in a slot of a stator core. The insulation sheet in a state where the thermosetting resin composition forming the insulation resin layer is cured, is disposed between the stator coil and an inner wall of the slot so as to insulate and fix the stator core and the stator coil.

A producing method for an insulation sheet according to the present disclosure is a producing method for an insulation sheet in which one or each of an insulation paper sheet and an insulation film is used as a base material, and an insulation resin layer made of a thermosetting resin composition in an uncured or semi-cured state is formed on one or each of both surfaces of the base material. The producing method includes: a first step of preparing a slurry of the thermosetting resin composition by stirring and mixing a thermosetting resin (A) that is in solid form at 25° C., a thermosetting resin (B) that is in liquid form at 25° C., a latent curing agent that is unreactive at 60° C. or lower, an inorganic filler having a maximum particle diameter smaller than a film thickness of the insulation resin layer and having an average particle diameter smaller than 0.5 times the film thickness, and a diluent organic solvent; and a second step of applying the slurry on the base material, a release paper sheet, or a release film, and drying the slurry. In the thermosetting resin composition in the first step, an amount of the thermosetting resin (A) per a total of 100 parts by mass of the thermosetting resin (A) and the thermosetting resin (B) is in a range of 30 parts by mass to 70 parts by mass.

The insulation sheet according to the present disclosure can assuredly fill a gap between members to be insulated and can insulate and fix both members since the insulation resin layer is compressed into a predetermined thickness by pressure application at normal temperature and is caused to flow by heating at the time of curing to permeate a narrow space between the members.

In the rotary electric machine according to the present disclosure, the insulation resin layer caused to flow by heating at the time of curing permeates a narrow space in a gap between the stator coil and the inner wall of the slot, and assuredly insulates and fixes the stator core and the stator coil. Thus, the insulation reliability, the thermal dissipation properties, and the vibration resistance are improved, and size reduction and output increase of the rotary electric machine are realized.

The producing method for an insulation sheet according to the present disclosure allows production of an insulation sheet that can assuredly fill a gap between members to be insulated and that can insulate and fix both members.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are sectional view showing a configuration example of an insulation sheet according to a first embodiment;

FIGS. 2A and 2B are sectional view showing a configuration example of a composite insulation sheet according to the first embodiment;

FIG. 3 is a graph for explaining a change, according to temperature change, in the storage shear modulus of an insulation resin layer in a third embodiment;

DETAILED DESCRIPTION OF THE PREFERRED EMBODIMENTS

First Embodiment

Figure 4:
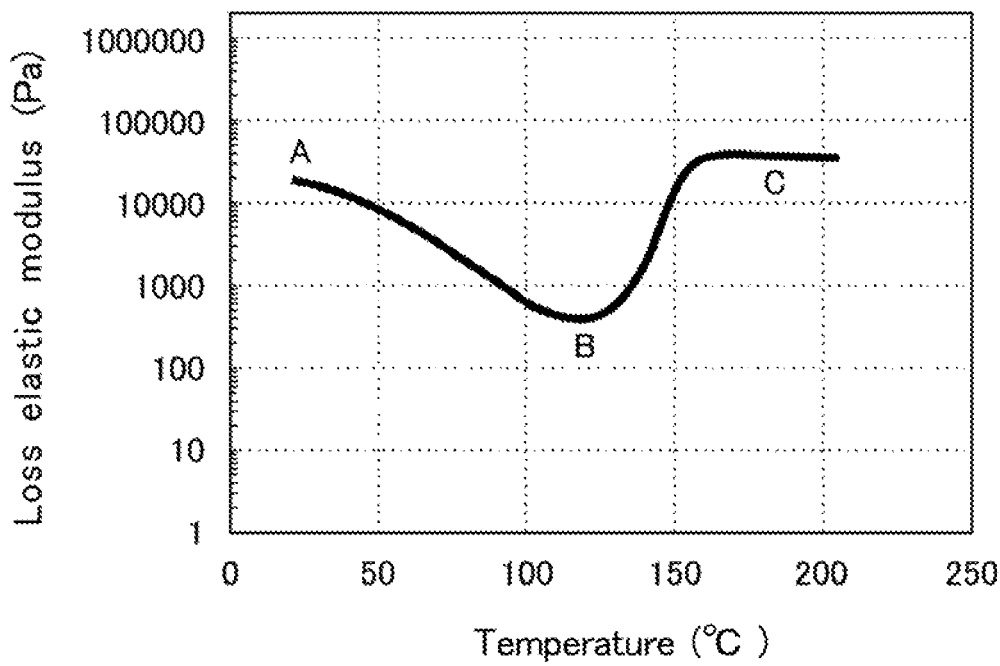
FIG. 4 is a graph for explaining a change, according to temperature change, in the loss elastic modulus of the insulation resin layer in the third embodiment.

Hereinafter, an insulation sheet according to a first embodiment will be described with reference to the drawings. FIG. 1A, 1B and FIG. 2A, 2B respectively show a configuration example of the insulation sheet and a configuration example of a composite insulation sheet according to the first embodiment. In the drawings, identical and corresponding portions are denoted by the same reference characters.

In an insulation sheet 1, either an insulation paper sheet or a thermoplastic insulation film is used as a base material 2, and an insulation resin layer 3 made of a thermosetting resin composition in an uncured or semi-cured state is formed on one or each of both surfaces of the base material 2. In the following description, if the insulation paper sheet and the insulation film are not particularly distinguished from each other, they are written simply as "base material 2". In the example shown in FIG. 1A, the insulation resin layer 3 is formed on one surface of the base material 2. In the example shown in FIG. 1B, the insulation resin layer 3 is formed on each of both surfaces of the base material 2.

In a composite insulation sheet 10, insulation paper sheets or thermoplastic insulation films are used as base materials 2 and 2a, the plurality of base materials 2 and 2a are stacked with adhesives 4 therebetween, and the insulation resin layer 3 is formed on the base material 2 at one or each of both ends. In the example shown in FIG. 2A, the insulation resin layer 3 is formed on the base material 2 at one end. In the example shown in FIG. 2B, the insulation resin layer 3 is formed on the base material 2 at each of both ends. Each adhesive 4 may be the insulation resin layer 3. The insulation resin layer 3 is flexible and has a high adhesion strength to the base material 2. Thus, the insulation resin layer 3 can cause the base materials to adhere to each other through thermocompression bonding. The base material 2a may be the same as or different from the base materials 2.

The plurality of base materials 2 and 2a included in the composite insulation sheet 10 may be either the insulation paper sheets or the insulation films, or include both the insulation paper sheets and the insulation films. The number of base materials 2 and 2a included in the composite insulation sheet 10 is not particularly limited. However, if the number increases, the total thickness of the composite insulation sheet 10 increases. Thus, the number is preferably about three.

Specific examples of the insulation paper sheet include aramid paper sheets, kraft paper sheets, and crepe paper sheets. As the insulation film, an engineering plastic or a super engineering plastic is suitable. Specific examples of the engineering plastic include polyacetal, polyamides, polycarbonates, modified polyphenylene ethers, polybutylene terephthalate, and polyethylene naphthalate. Specific examples of the super engineering plastic include polysulfone, polyethersulfone, polyphenylene sulfide, polyether ether ketone, polyimides, polyetherimide, fluororesin, and liquid crystal polymers.

Each base material 2 may be a composite base material in which one or both of insulation paper sheets and insulation films are stacked. Specifically, examples of the composite base material include: a composite insulation paper sheet including an insulation paper sheet and an insulation film; and a composite insulation film including a plurality of types of insulation films. For the composite base material, adhesion may be performed by an acrylic or epoxy-based generally used adhesive or an adhesive with high thermal conductivity containing a filler. In the case of an insulation sheet for a rotary electric machine required to have high heat resistance and high insulation properties, a composite base material including a high-heat-resistance aramid paper sheet, polyethersulfone, polybutylene terephthalate, polyethylene naphthalate, a polyimide, and the like, is suitable.

Second Embodiment

In a second embodiment, the thermosetting resin composition forming the insulation resin layer of the insulation sheet will be described. The thermosetting resin composition contains: a thermosetting resin (A) that is in solid form at 25° C.; a thermosetting resin (B) that is in liquid form at 25° C.; a latent curing agent that is unreactive at 60° C. or lower; and an inorganic filler having a maximum particle diameter smaller than a film thickness of the insulation resin layer and having an average particle diameter smaller than 0.5 times the film thickness. As necessary, the thermosetting resin composition further contains a curing accelerator, a thermoplastic resin, a film formability imparting agent, a tackifier, an adhesiveness imparting agent, and the like. In the following description, if the thermosetting resin (A) and the thermosetting resin (B) are not particularly distinguished from each other and both resins are meant or if a mixture resin of these resins is meant, they are written simply as "thermosetting resin". Normal temperature means about 25° C.

As the thermosetting resin, a resin that is well known as an epoxy resin, a phenolic resin, an unsaturated polyester resin, a polyurethane resin, a diallyl phthalate resin, or a silicone resin, is used. In particular, at least one of an epoxy resin, a phenolic resin, and an unsaturated polyester resin such as a vinyl ester resin generally used as an insulation varnish, is preferably contained.

Specific examples of the thermosetting resin include bisphenol A type epoxy resins, bisphenol F type epoxy resins, bisphenol AD type epoxy resins, brominated bisphenol A type epoxy resins, brominated bisphenol F type epoxy resins, brominated bisphenol AD type epoxy resins, alicyclic epoxy resins, brominated alicyclic epoxy resins, phenol novolac type epoxy resins, cresol novolac type epoxy resins, brominated phenol novolac type epoxy resins, brominated cresol novolac type epoxy resins, hydrogenated bisphenol A type epoxy resins, triglycidyl isocyanate, hydantoin type epoxy resins, heterocyclic epoxy resins, biphenyl backbone-containing aralkyl type epoxy resins, dicyclopentadiene type epoxy resins, novolac type phenolic resins, resol type phenolic resins, epoxy (meth)acrylate resins (vinyl ester-based resins), urethane (meth)acrylate resins, polyether (meth)acrylate resins, and polyester (meth)acrylate resins. These resins may be used singly, or two or more of these resins may be used in a mixed manner.

The thermosetting resin (A) is in solid form at normal temperature, and the softening temperature, which is the melting point or the glass transition point, of the thermosetting resin (A) is not higher than 150° C. and further preferably not higher than 125° C. If the softening temperature is higher than 150° C., a polymerization reaction with the thermosetting resin (B) less readily progresses at the time of heating. Thus, the heating temperature in a curing treatment step needs to be higher than 200° C., and this induces degradation of members to be insulated or the insulation film. Therefore, a softening temperature higher than 150° C. is not preferable.

The thermosetting resin (A) has to be dissolved in at least either the liquid-form thermosetting resin (B) or a diluent organic solvent (hereinafter, referred to as "diluent"). If the thermosetting resin (A) is not dissolved, a state where the resin components are evenly dissolved is not obtained at the time of preparation of a slurry, whereby a homogeneous insulation resin layer cannot be formed.

In a case where the thermosetting resin (A) is an epoxy resin, an epoxy resin having an epoxy equivalent not less than 200 and a softening point that is in a range of 50° C. to 160° C. (hereinafter, such lower limits and upper limits for numerical values and proportions will be written as, for example, "of 50° C. to 160° C.") is more preferable from the viewpoint of increasing force of adhesion to members to be insulated. Also in a case where the thermosetting resin (A) is an unsaturated polyester resin such as a vinyl ester resin, an unsaturated polyester resin having a softening point of 50° C. to 160° C. is preferable. These resins are excellent in workability at the time of premixing with other raw materials at normal temperature and easily melt by heating, thereby having improved capability of being evenly mixed with the other raw materials.

In the case where the thermosetting resin (A) is an epoxy resin, the thermosetting resin (B) is preferably an epoxy resin that is in liquid form at normal temperature in order to increase force of adhesion to the members to be insulated, and a bisphenol A type epoxy resin and a bisphenol F type epoxy resin are more preferably used in order to increase the solubility of the thermosetting resin (A). In the case where the thermosetting resin (A) is an unsaturated polyester resin, the thermosetting resin (B) is preferably a low-molecular-weight body that has a low viscosity and that is an oligomer or a monomer of an unsaturated polyester resin, in order to increase the solubility of the thermosetting resin (A).

In this manner, the thermosetting resin (A) and the thermosetting resin (B) that are in different forms at normal temperature are used, and blending conditions such as the mass ratio therebetween are adjusted. Accordingly, the insulation resin layer can be controlled in terms of the surface tack (tackiness), the mechanical strength (toughness), and the adhesiveness at normal temperature, the fluidity at the time of heating, and the like. 20 parts by mass to 80 parts by mass, and more preferably 30 parts by mass to 70 parts by mass, of the thermosetting resin (A) is contained per a total of 100 parts by mass of the thermosetting resin (A) and the thermosetting resin (B).

Regarding the mass ratio, the mass ratio of the thermosetting resin (A) to the thermosetting resin (B) (A/B) is preferably in a range of 20/80 to 80/20. If the mass ratio (A/B) is lower than 20/80, the amount of the liquid-form resin is large, and thus a stable insulation resin layer is not obtained after drying, whereby separation from a release base material cannot be performed. If the mass ratio (A/B) is higher than 80/20, the amount of the solid-form resin is large, and thus toughness of the insulation resin layer (the tenacity of the material) decreases. Accordingly, a crack and a chip are easily generated at the time of drying or at the time of separation from the release base material, whereby workability becomes poor.

In order to produce a stable insulation resin layer having high toughness, the mass ratio (A/B) is preferably in a range of 30/70 to 70/30. In order to ensure an adhesiveness that enables easy adhesion to the members to be insulated, the mass ratio (A/B) is preferably in a range of 30/70 to 50/50. Meanwhile, in a case where the surface of the insulation resin layer does not need to have adhesiveness (for example, in a case where adhesiveness causes workability to become poor), the mass ratio (A/B) is preferably in a range of 50/50 to 70/30 in order to reduce the surface tack.

The thermosetting resin composition may contain a curing agent for curing the thermosetting resin. The curing agent is not particularly limited, and a well-known curing agent can be selected as appropriate according to the type of the thermosetting resin. As the curing agent, an amine, a phenol, an acid anhydride, an imidazole, a polymercaptan curing agent, a polyamide resin, or the like is used.

Specific examples of the curing agent include: alicyclic acid anhydrides such as methyltetrahydrophthalic anhydride, methylhexahydrophthalic anhydride, and himic anhydride; aliphatic acid anhydrides such as dodecenyl succinic anhydride; aromatic acid anhydrides such as phthalic anhydride and trimellitic anhydride; dicyandiamide; aromatic diamines such as 4,4'-diaminodiphenylsulfone; organic dihydrazides such as adipic acid dihydrazide; boron halide amine complexes such as boron trifluoride, boron trichloride, and boron tribromide; tris(dimethylaminomethyl)phenol; dimethylbenzylamine; 1,8-diazabicyclo(5,4,0)undecene and derivatives thereof; imidazoles such as 2-methylimidazole, 2-ethyl-4-methylimidazole, 2-phenylimidazole, and 1-cyanoethyl-2-methylimidazole; polyhydric phenol compounds such as bisphenol A, bisphenol F, bisphenol S, a phenol novolac resin, a cresol novolac resin, and a p-hydroxystyrene resin; and organic peroxides.

Representative specific examples of the boron halide amine complexes include boron trifluoride monoethylamine complexes, boron trifluoride diethylamine complexes, boron trifluoride isopropylamine complexes, boron trifluoride chlorophenylamine complexes, boron trifluoride-triallylamine complexes, boron trifluoride benzylamine complexes, boron trifluoride aniline complexes, boron trichloride monoethylamine complexes, boron trichloride phenol complexes, boron trichloride piperidine complexes, boron trichloride dimethyl sulfide complexes, boron trichloride-N,N-dimethyloctylamine complexes, boron trichloride-N,N-dimethyldodecylamine complexes, and boron trichloride-N,N-diethyldioctylamine complexes. These curing agents may be used singly, or two or more of these curing agents may be used in combination.

The amount of the curing agent to be blended may be adjusted as appropriate according to the types of the thermosetting resin and the curing agent to be used, and the like. Ordinarily, the amount per 100 parts by mass of the thermosetting resin is preferably not less than 0.1 parts by mass and not greater than 200 parts by mass.

In the case where an epoxy resin is used as the thermosetting resin, the curing agent is preferably a latent curing agent that is unreactive at 60° C. or lower, from the viewpoint of the preservation stability, the curability, and the cured resin physical property of the insulation resin layer, and the like. Specific examples of the latent curing agent include: boron halide amine complexes such as a boron trifluoride-amine complex; dicyandiamide; organic acid hydrazides; and aromatic diamines such as 4,4'-diaminodiphenylsulfone. These latent curing agents may be used singly, or two or more of these latent curing agents may be used in combination. Regarding the amount of the latent curing agent to be blended, the equivalent ratio of the latent curing agent to the epoxy resin which is the thermosetting resin is 0.3 to 2.0, and, from the viewpoint of stability of cured product property, is preferably 0.5 to 1.5.

In the case where an unsaturated polyester resin is used as the thermosetting resin, the organic peroxide is used as a reaction initiator for initiating a polymerization reaction. The organic peroxide is not particularly limited and an organic peroxide well known in the technical field can be used, as long as the 10-hour half-life temperature thereof is not lower than 40° C. Specific examples of the organic peroxide include peroxides such as ketone peroxides, peroxyketals, hydroperoxides, dialkyl peroxides, diacyl peroxides, peroxyesters, and peroxydicarbonates. These organic peroxides may be used singly, or two or more of these organic peroxides may be used in a mixed manner.

If an organic peroxide having high active temperature is selected, the usable time of the insulation resin layer (i.e., the usable time of the insulation sheet) can be lengthened. The 10-hour half-life temperature of the organic peroxide is preferably not lower than 80° C. from the viewpoint of ensuring a usable time of an insulation resin layer suitable for impregnation of a coil. Meanwhile, the 10-hour half-life temperature of the organic peroxide is preferably not higher than the setting temperature of a curing oven at the time of curing the insulation resin layer, in order to cause curing of the insulation resin layer to efficiently progress.

Specific examples of the organic peroxide having such a 10-hour half-life temperature include 1,1-di(t-butylperoxy)cyclohexane, 1,1-di(t-hexylperoxy)cyclohexane, 1,1-di(t-hexylperoxy)-3,3,5-trimethylcyclohexane, 1,1-di(t-butylperoxy)-2-methylcyclohexane, 2,2-di(4,4-di-(butylperoxy)cyclohexyl)propane, n-butyl-4,4-di-(t-butylperoxy)valerate, 2,2-di-(t-butylperoxy)butane, t-hexylperoxyisopropyl monocarbonate, t-butylperoxy maleic acid, t-butylperoxy-3,5,5-trimethyl hexanoic acid, t-butylperoxy lauric acid, t-butylperoxyisopropyl monocarbonate, t-butylperoxy benzoate, t-butylperoxy acetate, t-hexylperoxy benzoate, 2,5-dimethyl-2,5-di(benzoylperoxy)hexane, t-butylperoxy-2-ethylhexyl monocarbonate, di(2-t-butylperoxyisopropyl)benzene, dicumyl peroxide, di-t-hexyl peroxide, 2,5-dimethyl-2,5-di(t-butylperoxy)hexane, di-t-hexyl peroxide, t-butylcumyl peroxide, di-t-butyl peroxide, 2,5-dimethyl-2,5-di(t-butylperoxy)hexyne-3, p-menthane hydroperoxide, t-butylperoxyallyl monocarbonate, methyl ethyl ketone peroxide, 1,1,3,3-tetramethylbutyl hydroperoxide, t-butyl hydroperoxide, cumin hydroperoxide, and diisopropylbenzene hydroperoxide. These organic peroxides may be used singly, or two or more of these organic peroxides may be used in a mixed manner.

Although the amount of the organic peroxide to be blended is not particularly limited, the amount per a total of 100 parts by mass of the polyester resin which is the thermosetting resin is ordinarily 0.1 parts by mass to 10 parts by mass and more preferably 0.5 parts by mass to 5 parts by mass. If the amount of the blended organic peroxide is less than 0.1 parts by mass, the crosslink density becomes low, and curing may be insufficient. Meanwhile, if the amount of the blended organic peroxide is greater than 10 parts by mass, the usable time of the insulation resin layer tends to be significantly shortened.

In addition, the thermosetting resin composition may contain, as necessary, a curing accelerator. The curing accelerator is not particularly limited, and a well-known curing accelerator may be selected as appropriate according to the type of the thermosetting resin. Specific examples of the curing accelerator include tertiary amines, imidazoles, and amine adducts. A curing accelerator that is unreactive at 60° C. or lower is more preferable from the viewpoint of the preservation stability, the curability, and the cured resin physical property of the insulation resin layer, and the like.

The amount of the curing accelerator to be blended per a total of 100 parts by mass of the thermosetting resin is ordinarily 0.01 parts by mass to 10 parts by mass and more preferably 0.02 parts by mass to 5.0 parts by mass. If the amount of the curing accelerator is less than 0.01 parts by mass, inferiority in the effect of promoting a curing reaction, results. Meanwhile, if the amount is greater than 10 parts by mass, the usable time tends to be shortened.

In addition, the thermosetting resin composition may contain, as necessary, a film formability imparting agent in order to improve film formabilities such as film thickness uniformity and surface smoothness. As the film formability imparting agent, a thermoplastic resin having a weight average molecular weight of 10,000 to 100,000 is used. The amount of the thermoplastic resin per a total of 100 parts by mass of the thermosetting resin (A) and the thermosetting resin (B) is 1 part by mass to 40 parts by mass. The thermoplastic resin is not particularly limited, and a well-known thermoplastic resin can be selected as appropriate according to the type of the thermosetting resin. Specific examples of the thermoplastic resin include phenoxy resins and saturated polyester resins. These film formability imparting agents may be used singly, or two or more of these film formability imparting agents may be used in combination.

If the weight average molecular weight of the thermoplastic resin is less than 10,000, the film formability is not improved. Meanwhile, if the weight average molecular weight is greater than 100,000, the solubility and the dispersibility into the liquid-form thermosetting resin (B) are poor, and a slurry cannot be prepared. From the viewpoint of curing promoting property, cured resin physical property, and the like, the amount of the film formability imparting agent to be blended per a total of 100 parts by mass of the thermosetting resin is ordinarily 1 part by mass to 40 parts by mass and more preferably 5 parts by mass to 30 parts by mass. If the amount of the film formability imparting agent is less than 1 part by mass, inferiority in the effect of improving the film formability, results. Meanwhile, if the amount is greater than 40 parts by mass, the solubility and the dispersibility into the liquid-form thermosetting resin (B) are poor, and a slurry cannot be prepared.

In addition, the thermosetting resin composition may contain, as necessary, a tackifier in order to improve the surface tack of the insulation resin layer. The tackifier is not particularly limited and a well-known tackifier can be selected as appropriate according to the type of the thermosetting resin, as long as the weight average molecular weight of the tackifier is 10,000 to 200,000. Specific examples of the tackifier include terpene-based resins, rosin-based resins, natural rubber, styrene-based elastomers, polyvinyl acetal-based resins, polyvinyl formal-based resins, and polyvinyl butyral-based resins. These tackifiers may be used singly, or two or more of these tackifiers may be used in combination.

If the weight average molecular weight of the tackifier is less than 10,000, the adhesiveness is not improved. Meanwhile, if the weight average molecular weight is greater than 200,000, the solubility and the dispersibility into the liquid-form thermosetting resin (B) are poor, and a slurry cannot be prepared. From the viewpoint of curing promoting property and cured resin physical property, the amount of the tackifier to be blended per a total of 100 parts by mass of the thermosetting resin is ordinarily 1 part by mass to 20 parts by mass and more preferably 2 parts by mass to 10 parts by mass. If the amount of the tackifier is less than 1 part by mass, inferiority in the effect of improving the surface tack, results. Meanwhile, if the amount is greater than 20 parts by mass, the solubility and the dispersibility into the liquid-form thermosetting resin (B) are poor, and a slurry cannot be prepared.

In addition, the thermosetting resin composition may contain an adhesiveness imparting agent from the viewpoint of improving the force of adhesion at an interface between the thermosetting resin and the inorganic filler or an interface between the insulation resin layer and a member to be insulated. The adhesiveness imparting agent is not particularly limited, and a well-known adhesiveness imparting agent can be selected as appropriate according to the type of the thermosetting resin or the inorganic filler.

Specific examples of the adhesiveness imparting agent include silane coupling agents such as γ-glycidoxypropyltrimethoxysilane, N-ρ(aminoethyl)γ-aminopropyltriethoxysilane, N-phenyl-γ-aminopropyltrimethoxysilane, and γ-mercaptopropyltrimethoxysilane. These adhesiveness imparting agents may be used singly, or two or more of these adhesiveness imparting agents may be used in combination. The amount of the adhesiveness imparting agent to be blended may be set as appropriate according to the type of the thermosetting resin or the adhesiveness imparting agent, and the like. Ordinarily, the amount per 100 parts by mass of the thermosetting resin is preferably 0.01 parts by mass to 5 parts by mass.

In addition, the thermosetting resin composition may contain a filler from the viewpoint of improvement in thermal conductivity and mechanical strength, increase in the film thickness of the insulation resin layer, and the like. The filler is not particularly limited, and a well-known filler can be selected as appropriate according to the purpose. The filler may be a filler that is subjected to surface treatment with a silane-based coupling agent, a titanate-based coupling agent, or the like or that is not subjected to such surface treatment.

Specific examples of the inorganic filler include crystalline silica, fused silica, alumina, talc, clay, calcium carbonate, calcium silicate, titanium dioxide, silicon nitride, aluminum hydroxide, aluminum nitride, boron nitride, glass, barium sulfate, magnesia, beryllium oxide, mica, and magnesium oxide. Although the form of the filler is preferably a fractured form or a spherical form, the form may be a nearly spherical form, a scale form, a fibrous form, a milled fiber form, a whisker form, or the like. These fillers may be used singly, or two or more of these fillers may be used in a mixed manner.

In addition, a resin-based filler such as a thermoplastic resin, a rubber component, or any of various oligomers may be added for the purpose of improving the crack resistance and the shock resistance of the insulation resin layer having been cured. Specific examples of the thermoplastic resin include butyral resins, polyvinyl acetal resins, polyamide resins, aromatic polyester resins, phenoxy resins, MBS resins (methylmethacrylate-butadiene-styrene copolymers), ABS resins (acrylonitrile-butadiene-styrene copolymers), and acrylic resins. The thermoplastic resin can be modified with silicone oil, silicone resin, silicone rubber, fluororubber, or the like. In addition, various plastic powders, various engineering plastic powders, and the like may be added.

The amount of the filler to be blended only has to be an amount that enables the resin composition to be evenly mixed. The amount per 100 parts by mass of the thermosetting resin is ordinarily not greater than 85 parts by mass and more preferably not greater than 50 parts by mass. If the amount of the filler is greater than 85 parts by mass, the filler cannot be evenly mixed with the resin, and the reproducibility of a property tends to fail to be obtained. The volume ratio of the inorganic filler to the entirety of the composition is preferably not higher than 50%.

The insulation sheet is inserted in a gap between members to be insulated (e.g., between a coil and a core) and used as an inter-phase insulator. Thus, the filler of the thermosetting resin composition preferably has: a maximum particle diameter that is smaller than a dimension obtained by subtracting the thickness of the base material of the insulation sheet from the dimension of the gap; and an average particle diameter that is smaller than 0.5 times the dimension of the gap. For example, in a case where an actually measured dimension which is obtained by subtracting the thickness of the base material from the dimension of the gap and which is inclusive of a tolerance is 10 μm to 100 μm, a filler having a maximum particle diameter not larger than 10 μm and having an average particle diameter not larger than 5 μm is selected.

Furthermore, an anti-settling agent or a dispersant for inhibiting solid powders of the filler and the like from settling in the resin, an antifoaming agent for preventing generation of voids, a slidability improver or an anti-blocking agent such as polymer beads for preventing blocking between insulation resin layers, a coating fixing agent, an antioxidant, a flame retardant, a colorant, a viscosity improver, a viscosity reducer, a surfactant, and the like may be blended in the thermosetting resin composition.

Third Embodiment

In a third embodiment, characteristics of the insulation resin layer and the insulation sheet will be described. The insulation resin layer preferably has high surface smoothness and high flexibility. The in-plane distribution of the film thickness of the insulation resin layer is set to fall within ±30% of the average value of the film thickness in order to obtain a favorable capability of adhesion to a member to be insulated and in order not to form any air space between the member to be insulated and the insulation resin layer having been cured.

The insulation resin layer has, at 25° C., such a flexibility as not to generate any crack even if being bent by 180 degrees. If drying progresses by excessive heating, a curing reaction of the resins in addition to the volatilization of the diluent progresses, whereby the insulation resin layer may come to have no flexibility. In this case, the insulation resin layer does not have such a flexibility as to be fitted along the shape of the surface of a member. Thus, when the insulation sheet is disposed in a gap between members, the insulation resin layer may suffer a crack, or may not be adhered and fixed to the members even after being cured by heating.

If the insulation resin layer has an overly large film thickness, the internal stress thereof increases, and a crack may be generated at the time of bending by 180 degrees. The film thickness of the insulation resin layer is preferably 1 μm to 500 μm, and, in order to completely fill a gap between members to be insulated, more preferably 5 μm to 300 μm. If the film thickness is smaller than 1 μm, it becomes difficult to form an insulation resin layer having no pinhole. Meanwhile, if the film thickness is larger than 500 μm, a crack is highly likely to be generated in a 180-degree bending test.

The film thickness of the insulation resin layer is not smaller than 1.1 times a dimension obtained by subtracting the thickness of the base material from the dimension of a gap between members to be insulated. The film thickness is ordinarily set to be 1.1 times to 2.0 times the dimension, and more preferably set to be 1.3 times to 1.7 times the dimension. Specifically, if the dimension obtained by subtracting the thickness of the base material from the dimension of the gap is 100 μm, the film thickness of the insulation resin layer is preferably 110 μm to 200 μm and more preferably 130 μm to 170 μm. If the film thickness is smaller than 110 μm, the heated insulation resin layer is not sufficiently packed in a narrow space in the gap. Meanwhile, if the film thickness is larger than 200 μm, deterioration of assemblability such as inability to, when forming a stator of a rotary electric machine, form the stator into an annular shape due to generation of a gap between slots, may occur.

The film thickness (total thickness) of the insulation sheet is reduced through compression by at least 10% under a pressure of 25 MPa at 25° C. If a tolerance on the dimension of the gap between the members is taken into consideration, the film thickness is more preferably reduced through compression by at least 20%. The non-volatile content of the insulation resin layer is not less than 97 parts by mass (%). Thus, if the insulation resin layer is completely cured, the volume thereof decreases by 3% to 10%. Since the base material of the insulation sheet is hardly compressed under a pressure of 25 MPa depending on the type, the film thickness of the insulation resin layer needs to be larger, by at least 10%, than the dimension obtained by subtracting the thickness of the base material from the dimension of the gap. In a case where the film thickness of the insulation sheet is reduced through compression by only less than 10% under a pressure of 25 MPa at 25° C., even if the insulation sheet has filled the gap at the time of disposition thereof, a minute gap may be formed by shrinkage due to curing.

In a case where the insulation sheet is used in a state of being adhered to the members in advance, the insulation sheet preferably has a surface tack (tackiness) at 25° C. Meanwhile, in a case where the workability becomes poor if the adhesion to the members is performed in advance, the insulation sheet can be made so as to have no surface tack while having flexibility and film-thickness compressibility, with the aforementioned blending ratios, drying conditions, and the like. The criterion for judgement of no surface tack is that the insulation sheet is not adhered to members to be insulated, even when being pressed to the members under a pressure of 2 MPa at 40° C. If the insulation sheet is adhered under this condition, the surface tack may intensify and the workability may become poor, depending on the work environment temperature (25 to 35° C.)

The insulation resin layer of the insulation sheet has to have, at 25° C., such a flexibility as to be compressed, and has to flow at the time of heating to permeate a narrow space (for example, uneven shapes of a coil and a core, or the like) between members. In order to obtain such characteristics, the dried state of the insulation resin layer is important. The flexibility can be easily determined according to whether no crack is generated even when the insulation resin layer is bent at 180° C. As a method for more quantitatively determining these flexibility and fluidity properties, an elastic modulus evaluation by viscoelasticity measurement is known.

In FIG. 3, a change, according to temperature change, in the storage shear modulus (G') of the insulation resin layer is indicated as a specific example of the viscoelasticity measurement in which the insulation resin layer was independently collected. The storage shear modulus at 25° C. (indicated by "A" in FIG. 3) is $1.0 \times 10^3$ Pa to $5.0 \times 10^4$ Pa and decreases in accordance with temperature increase, and the smallest value thereof (indicated by "B" in FIG. 3) is present at 80° C. to 150° C. and is 10 Pa to $2.0 \times 10^3$ Pa. An insulation resin layer in which the above-described values are not satisfied, does not allow a desired compression rate to be obtained at the time of pressure application, whereby permeability into the narrow space between the members is not obtained.

If the smallest value of the storage shear modulus is present at lower than 80° C., a reaction progresses while the insulation resin layer is left at normal temperature, whereby the flexibility easily decreases. Meanwhile, if the smallest value is present at not lower than 150° C., the heating temperature necessary for complete curing becomes high, whereby the base material may be degraded. From the viewpoint of maintaining the form of the insulation resin layer and obtaining fluidity at heating temperature, it is more preferable that the storage shear modulus at 25° C. is $3.0 \times 10^3$ Pa to $3.0 \times 10^4$ Pa, and that the smallest value of the storage shear modulus at 80° C. to 150° C. is $1.0 \times 10^2$ Pa to $5.0 \times 10^2$ Pa and is not greater than one tenth of the value at 25° C. The storage shear modulus at not lower than 180° C. is saturated at not less than $1.0 \times 10^5$ Pa owing to influence of curing (indicated by "C" in FIG. 3).

FIG. 4 indicates a change, according to temperature change, in the loss elastic modulus (G") of the insulation resin layer. The loss elastic modulus at 25° C. (indicated by "A" in FIG. 4) is $1.0 \times 10^3$ Pa to $5.0 \times 10^4$ Pa and decreases in accordance with temperature increase, and the smallest value thereof (indicated by "B" in FIG. 4) is present at 80° C. to 150° C. and is 10 Pa to $2.0 \times 10^3$ Pa. In addition, the local maximum value of the loss tangent (tan δ) is present at 80° C. to 150° C. and is 1.0 to 3.5. An insulation resin layer in which the loss elastic modulus and the loss tangent do not satisfy the above-described values, does not allow a desired compression rate to be obtained at the time of pressure application, whereby permeability into the narrow space between the members is not obtained.

If the smallest value of the loss elastic modulus or the local maximum value of the loss tangent is present at lower than 80° C., a reaction progresses while the insulation resin layer is left at normal temperature, whereby the flexibility easily decreases. Meanwhile, if these values are present at not lower than 150° C., the heating temperature necessary for complete curing becomes high, whereby the base material may be degraded. From the viewpoint of maintaining the insulation resin layer and obtaining fluidity at heating temperature, it is more preferable that the loss elastic modulus at 25° C. is $3.0 \times 10^3$ Pa to $3.0 \times 10^4$ Pa and that the smallest value of the loss elastic modulus at 80° C. to 150° C. is $1.0 \times 10^2$ Pa to $1.0 \times 10^3$ Pa and is not greater than one fifth of the value at 25° C. The loss elastic modulus at not lower than 180° C. is saturated at not less than $5.0 \times 10^3$ Pa owing to influence of curing (indicated by "C" in FIG. 4), and the loss tangent is saturated at not greater than 0.2.

Figure 5:
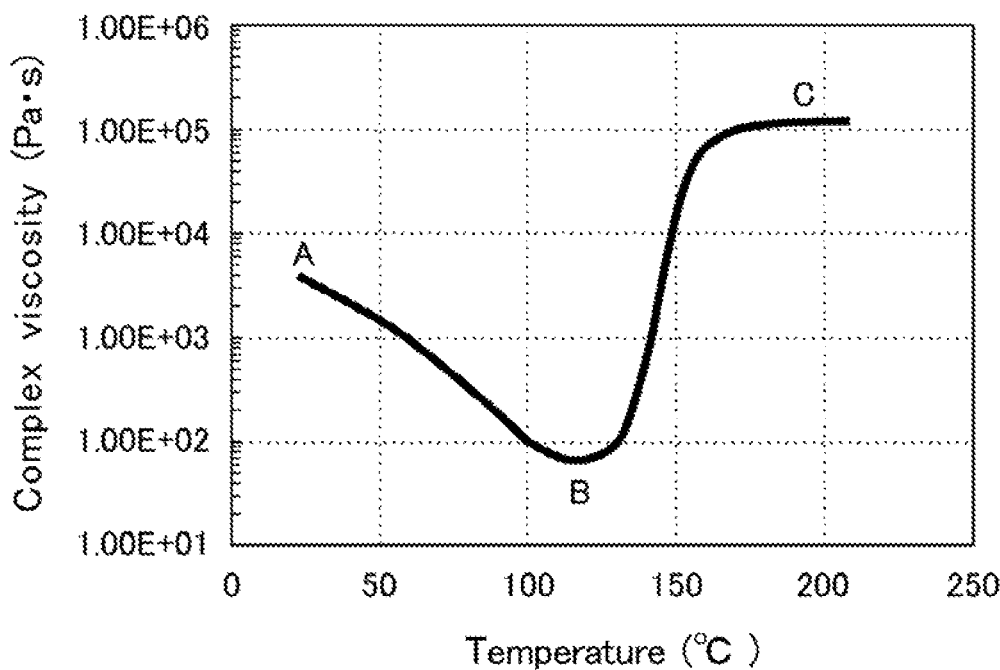
FIG. 5 is a graph for explaining a change, according to temperature change, in the complex viscosity of the insulation resin layer in the third embodiment.

The flexibility and fluidity properties of the insulation resin layer can be evaluated also based on complex viscosity. FIG. 5 indicates a change, according to temperature change, in the complex viscosity of the insulation resin layer obtained by dynamic viscoelasticity measurement. The complex viscosity at 25° C. (indicated by "A" in FIG. 5) is $6.0 \times 10^2$ Pa·s to $1.0 \times 10^4$ Pa·s and decreases in accordance with temperature increase, and the smallest value thereof (indicated by "B" in FIG. 5) is present at 80° C. to 150° C. and is not greater than $5.0 \times 10^2$ Pa·s.

An insulation resin layer in which these values are not satisfied, does not allow a desired compression rate to be obtained at the time of pressure application, whereby permeability into the narrow space between the members is not obtained. Furthermore, from the viewpoint of maintaining the form of the insulation resin layer and obtaining fluidity at heating temperature, it is more preferable that the complex viscosity at 25° C. is $1.0 \times 10^3$ Pa·s to $5.0 \times 10^3$ Pa·s and that the smallest value of the complex viscosity at 80° C. to 150° C. is 1 Pa·s to $5.0 \times 10^2$ Pa·s and is not greater than one tenth of the value at 25° C. The complex viscosity at not lower than 180° C. is saturated at not less than $1.0 \times 10^4$ Pa·s owing to influence of curing (indicated by "C" in FIG. 5).

The insulation sheet is heated and cured in a curing treatment step after being disposed in a gap between members to be insulated (for example, between a coil and a core, or the like). Although the heating temperature in the curing treatment step varies according to the types of the curing agent and the curing accelerator, the heating temperature and time are set to such a heating temperature and time as not to cause degradation of the members to be insulated. Specifically, the heating temperature is preferably 100° C. to 200° C. and more preferably 130° C. to 190° C. The heating time is preferably 1 minute to 6 hours and more preferably 3 minutes to 2 hours.

If the heating temperature is lower than 100° C. or the heating time is shorter than 1 minute, curing is insufficiently performed, and adhesion and fixation to the members cannot be performed. At a relatively low temperature of 100° C. to 170° C., the members are less likely to be degraded even if 6 hours are exceeded. However, if 6 hours are exceeded at not lower than 170° C. or heating to a high temperature not lower than 200° C. is performed, the members may be degraded. Since the insulation sheet hardly contains a solvent, the insulation sheet can be cured also by induction heating, electric conduction heating, or the like, whereby the curing treatment step is simplified.

In the insulation sheet, in order to integrate the members to be insulated with each other and improve vibration resistance, the force of adhesion to the members after curing is preferably not less than 10 N/m. In order to suppress variation in vibration resistance property, the force of adhesion is more preferably not less than 20 N/m. At a force of adhesion less than 10 N/m, sufficient vibration resistance is not obtained, and the long-term reliability of the device deteriorates.

The insulation sheet having the above-described characteristics can assuredly fill a gap between members to be insulated and can insulate and fix both members since the insulation resin layer is efficiently compressed into a predetermined thickness by pressure application at normal temperature and is caused to flow by heating at the time of curing to permeate a narrow space between the members.

Fourth Embodiment

In a fourth embodiment, a producing method for the insulation sheet will be described. The process for producing the insulation sheet includes: a first step of preparing a slurry of the thermosetting resin composition; and a second step of applying, on the base material or the like, the slurry prepared in the first step, and drying the slurry. In the first step, a diluent is added to the thermosetting resin composition so as to obtain a predetermined mixture viscosity, and the mixture is stirred and mixed with a stirring machine until the filler is evenly dispersed without settling, thereby preparing the slurry.

That is, the slurry contains at least: the thermosetting resin (A) that is in solid form at 25° C.; the thermosetting resin (B) that is in liquid form at 25° C.; the latent curing agent that is unreactive at 60° C. or lower; the inorganic filler having a maximum particle diameter smaller than the film thickness of the insulation resin layer and having an average particle diameter smaller than 0.5 times the film thickness of the insulation resin layer; and the diluent. Blending thereof is performed such that 30 parts by mass to 70 parts by mass of the thermosetting resin (A) is contained per a total of 100 parts by mass of the thermosetting resin (A) and the thermosetting resin (B).

The diluent for dissolving each thermosetting resin substantially completely disappears as a result of volatilization or evaporation after film coating. The diluent is not particularly limited, and a well-known diluent can be selected as appropriate according to the types of the thermosetting resin, the inorganic filler, and the like to be used. Specific examples of the diluent include toluene and methyl ethyl ketone. These solvents may be used singly, or two or more of these solvents may be used in combination. The amount of the solvent to be blended is not particularly limited as long as a mixture viscosity that enables kneading is obtained. The amount per a total of 100 parts by mass of the thermosetting resin and the inorganic filler is ordinarily 20 parts by mass to 200 parts by mass.

In the second step, the slurry is applied on the base material for the insulation sheet, a release paper sheet, or a release film by a sheet coating machine so as to have a predetermined film thickness, and the diluent is volatilized under a temperature condition of 80° C. to 160° C. in a drying oven, to form an insulation resin layer. In a case where the slurry is applied on the release paper sheet or the release film and dried in the second step, a third step is performed in which the thermosetting resin composition dried in the second step is, while being heated, pressed and adhered to one or each of both surfaces of the base material. In the third step, a device that is well known in the technical field such as a laminator processing device can be used.

As another producing method, the insulation resin layer may be formed by impregnating the slurry, which has been prepared in the first step, with the insulation film or the insulation paper sheet which is the base material, and volatilizing the diluent under a temperature condition of 80° C. to 160° C. in the drying oven while performing pull-up. In this case, the film thickness of the insulation resin layer is adjusted according to the viscosity of the slurry.

The non-volatile content per a total of 100 parts by mass of the insulation resin layer after drying is not less than 97 parts by mass and more preferably not less than 99 parts by mass. If the non-volatile content is less than 97 parts by mass, the remaining diluent makes it difficult to perform separation from the release paper sheet or the like. The insulation resin layer may be in an uncured state in which the diluent has been merely volatilized (A-stage state), or may be in a semi-cured state in which heating for causing a curing reaction to progress has been further performed after the volatilization of the diluent (B-stage state). In the produced insulation sheet, since adhesion (blocking) occurs in a state where insulation resin layers are in contact with each other, the surface of each insulation resin layer is covered by the release film or the release paper sheet, and the release film or the release paper sheet is separated at the time of use.

Fifth Embodiment

Figure 6:
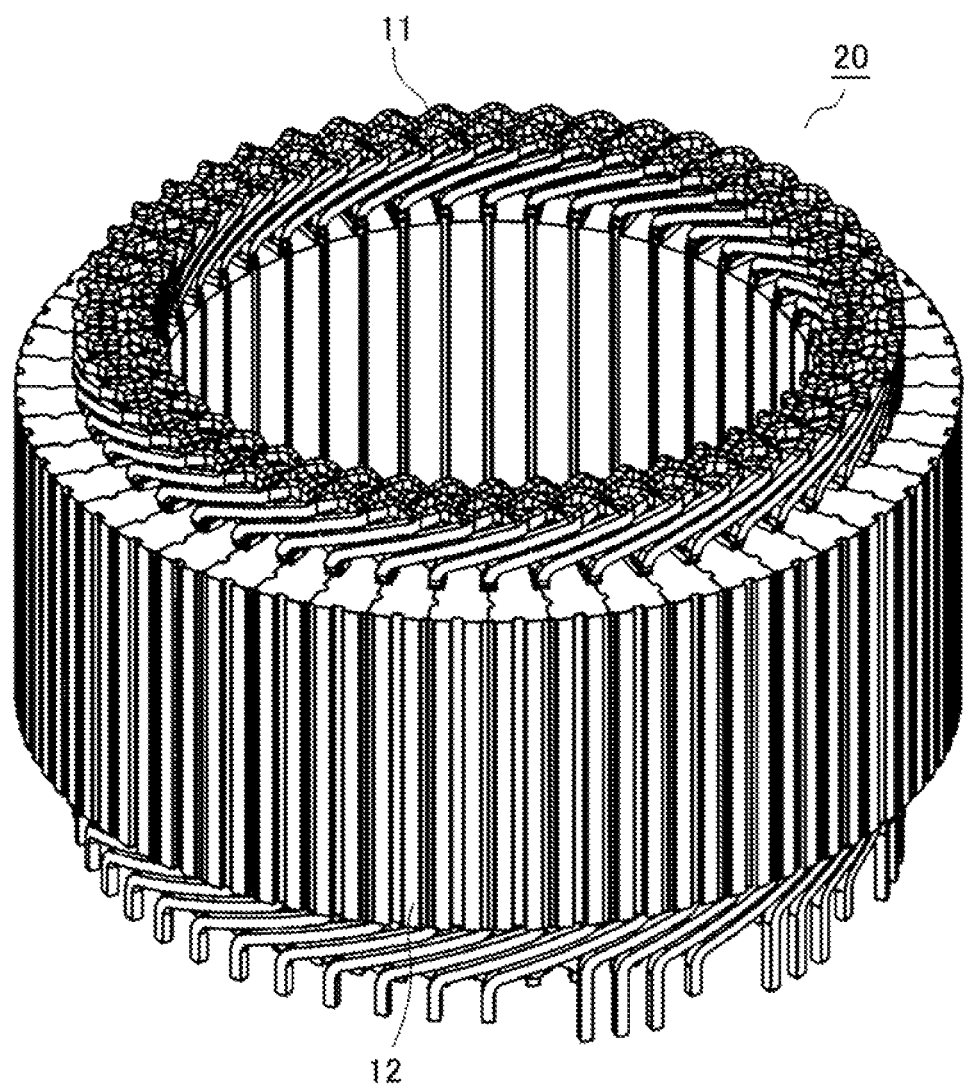
FIG. 6 is a perspective view of a stator of a rotary electric machine according to a fifth embodiment.
Figure 7:
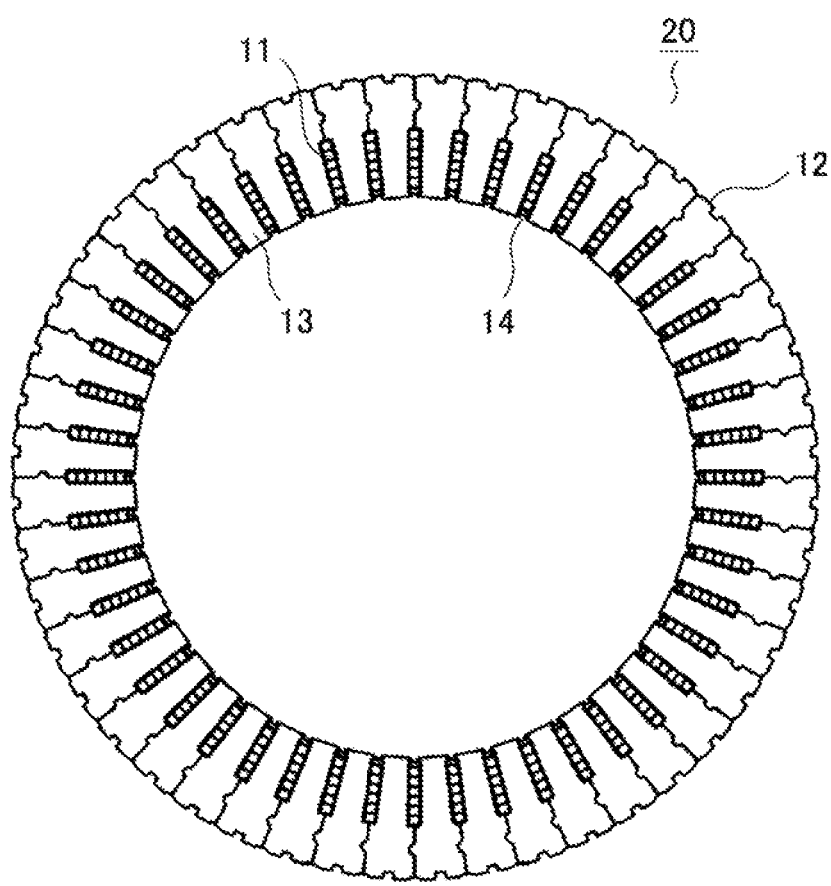
FIG. 7 is a sectional view of the stator of the rotary electric machine according to the fifth embodiment.
Figure 8:
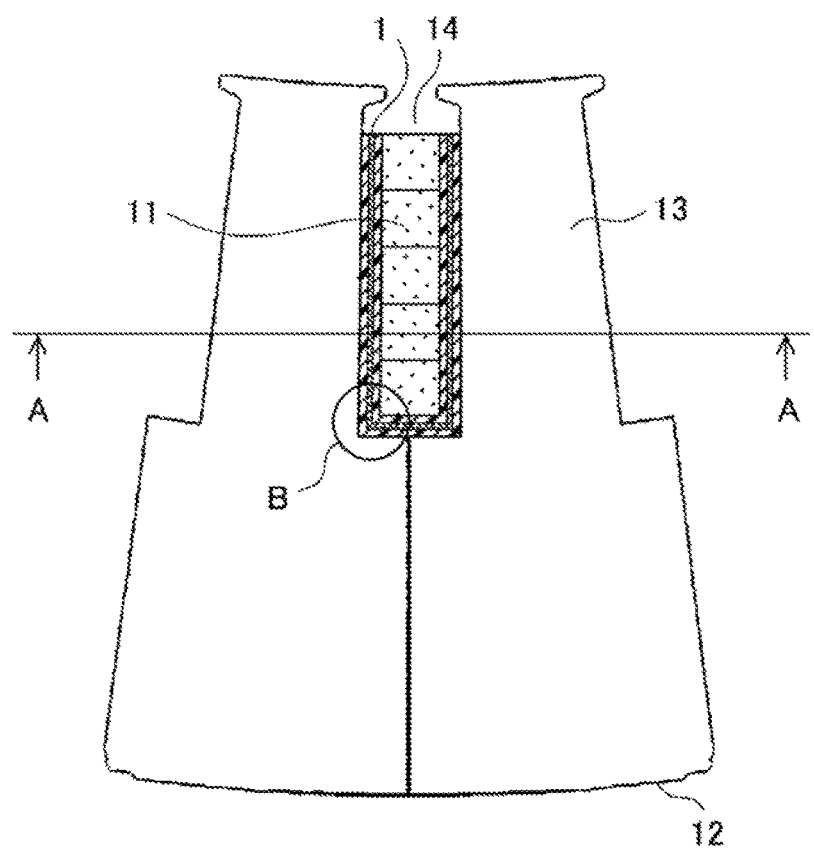
FIG. 8 is a diagram for explaining a usage example of the insulation sheet in the rotary electric machine according to the fifth embodiment.
Figure 9:
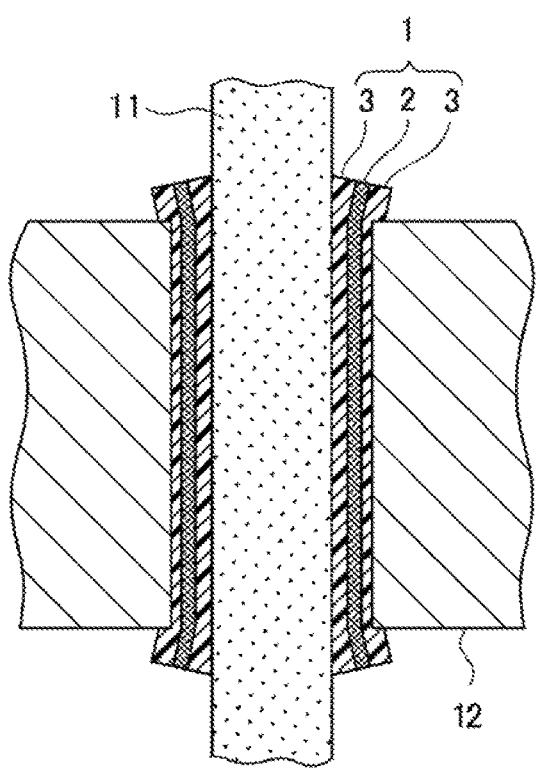
FIG. 9 is a diagram for explaining the usage example of the insulation sheet in the rotary electric machine according to the fifth embodiment.
Figure 10:
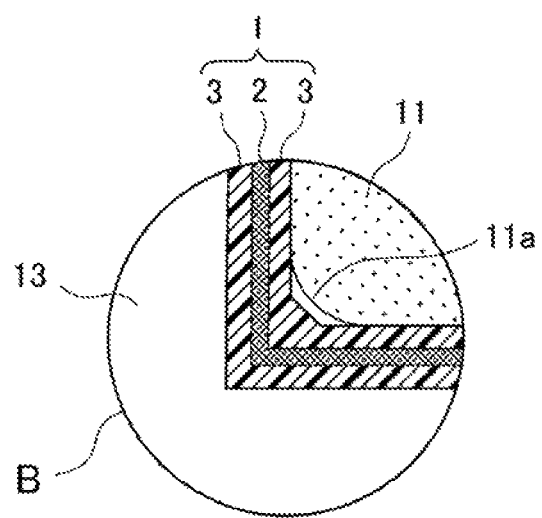
FIG. 10 is a diagram for explaining the usage example of the insulation sheet in the rotary electric machine according to the fifth embodiment.

In a fifth embodiment, a usage example of the insulation sheet in a rotary electric machine will be described with reference to FIG. 6 to FIG. 10. FIG. 6 and FIG. 7 are a perspective view and a sectional view of a stator of the rotary electric machine according to the fifth embodiment. FIG. 8 to FIG. 10 are each a diagram for explaining a usage example of the insulation sheet in the rotary electric machine according to the fifth embodiment. FIG. 9 is a sectional view taken along the line indicated by A-A in FIG. 8. FIG. 10 is an enlarged view of the portion indicated by "B" in FIG. 8.

A rotary electric machine such as an electric motor, a power generator, or a compressor is provided with a stator 20 including stator coils 11 and an annular stator core 12. A predetermined number of slots 14 are formed in the circumferential direction between tooth portions 13 of the stator core 12, and the stator coils 11 are accommodated in the slots 14. The insulation sheet 1 in a state where the thermosetting resin composition forming the insulation resin layer 3 is cured, is disposed between each stator coil 11 and the inner wall of the corresponding slot 14 so as to insulate and fix the stator core 12 and the stator coil 11.

In a case where the insulation sheet 1 is adhered to the stator coil 11 or the stator core 12 in advance, an insulation resin layer 3 having surface tack at 25° C. is selected. Meanwhile, in a case where workability at the time of inserting the stator coil 11 becomes poor if the insulation sheet 1 is adhered in advance, an insulation sheet 1 having no surface tack at 25° C. is selected.

In the example shown in FIG. 8, an insulation sheet 1 in which the insulation resin layer 3 is formed on each of both surfaces of the base material 2 is used. However, an insulation sheet 1 in which the insulation resin layer 3 is formed on one surface of the base material 2 may be used. In a case where the insulation resin layer 3 is formed only on one surface or the insulation resin layer 3 has no surface tack, the insulation sheet 1 may be adhered to the stator core 12 by using double-sided tape or the like.

In a process for producing the rotary electric machine, the insulation sheet 1 is disposed by being inserted or adhered in a gap between the stator core 12 and each stator coil 11, and the stator core 12 is formed into an annular shape, thereby compressing and fixing the insulation sheet 1. The film thickness of the insulation resin layer 3 is set to 1.1 times to 2.0 times a dimension obtained by subtracting the thickness of the base material 2 from the dimension of the gap between the stator core 12 (the inner wall of each slot 14) and the corresponding stator coil 11. The film thickness is reduced by pressure at the time of forming the stator core 12 into an annular shape. Therefore, as shown in FIG. 9, the thickness of the insulation sheet 1 in the slot 14 is smaller than the thickness of the insulation sheet 1 outside the slot 14.

The insulation resin layer 3 permeates, by heating during the curing treatment, a narrow space in the gap between the stator core 12 and the stator coil 11 and a narrow space in a gap in the stator coil 11. Thus, the insulation resin layer 3 can eliminate air spaces and assuredly fill the gaps. In addition, as shown in FIG. 10, the thickness of the insulation resin layer 3 increases at a bent portion of the insulation sheet 1. Thus, even if there is variation in the dimension of the gap between the stator core 12 and a corner 11a of the stator coil 11, the gap can be easily filled. FIG. 10 shows the insulation sheet 1 before curing treatment. After the curing treatment, the gap between the stator core 12 and the corner 11a of the stator coil 11 is filled by the thermosetting resin composition. In the insulation resin layers 3 having been cured, the forces of adhesion to the stator core 12 and the stator coil 11 are each 20 N/m or greater.

Owing to these features, in the rotary electric machine in which the insulation sheet 1 is used, insulation performance for the stator coil 11 is high, and insulation deterioration is less likely to occur. In addition, heat generated from a winding of the stator coil 11 can be efficiently dissipated to the stator core 12. In addition, since the stator coil 11 can be assuredly fixed, mechanical strength is maintained, and NVH properties are improved. In addition, since the insulation sheet 1 hardly contains a solvent, the insulation sheet 1 can be cured not only in a general-purpose heating oven but also by induction heating and electric conduction heating. Furthermore, since less energy is lost during the curing treatment step, the curing time is shortened, and the process for producing the rotary electric machine is simplified. Therefore, the rotary electric machine in which the insulation sheet 1 is used has improved insulation reliability, thermal dissipation properties, and vibration resistance, and thus size reduction and output increase thereof are realized.

EXAMPLES

Hereinafter, the present disclosure will be described in detail by means of examples and comparative examples. However, the present disclosure is not limited thereto. In the examples and the comparative examples, the following materials were mixed according to the formulas indicated in Table 1 and Table 2, thereby preparing thermosetting resin compositions. A diluent was added to each of the thermosetting resin compositions, to prepare a slurry. The slurry was applied on a base material, and the diluent was volatilized by drying, thereby producing an insulation resin layer.

<Solid-Form Thermosetting Resin (A)>
(1-1) Bisphenol A type epoxy resin (epoxy equivalent: 950, softening point: 95° C.)
(1-2) Bisphenol A type epoxy resin (epoxy equivalent: 2000, softening point: 128° C.)
(1-3) Bisphenol A type vinyl ester resin (polymerization average molecular weight: 2500, softening point: 95° C.)

<Liquid-Form Thermosetting Resin (B)>
(2-1) Bisphenol A type epoxy resin (epoxy equivalent: 190)
(2-2) Bisphenol F type epoxy resin (epoxy equivalent: 170)
(2-3) Neopentyl glycol diacrylate (viscosity at 25° C.: 6 mPa·s)

<Curing Agent>
(3-1) Dicyandiamide (reaction initiation temperature: 160° C.)
(3-2) Xylylenediamine (reactive at normal temperature)
(3-3) t-butylcumyl peroxide (10-hour half-life temperature: 119.5° C.)
(3-4) Diisobutyl peroxide (10-hour half-life temperature: 32.7° C.)

<Curing Accelerator>
(4-1) 1-cyanoethyl-2-phenylimidazole (reaction initiation temperature: 125° C.)
(4-2) 1,8-diazabicyclo(5,4,0)undecene-7 (reaction initiation temperature: 100° C.)

<Thermoplastic Resin>
(5-1) Phenoxy resin (polymerization average molecular weight: 150 thousand)
(5-2) Polyester resin (polymerization average molecular weight: 70 thousand)

<Inorganic Filler>
(6-1) Fused silica (maximum particle diameter: 10 μm, average particle diameter: 3 μm)
(6-2) Crystalline silica (maximum particle diameter: 150 μm, average particle diameter: 100 μm)
(6-3) Alumina (maximum particle diameter: 18 μm, average particle diameter: 5 μm)
(6-4) Calcium carbonate (maximum particle diameter: 12 μm, average particle diameter: 5 μm)

<Base Material>
(7-1) Aramid paper sheet (thickness: 0.18 mm)
(7-2) Polyethylene terephthalate (thickness: 0.1 mm)
(7-3) Composite insulation paper sheet: aramid paper sheet/polyimide/aramid paper sheet (thickness: 0.15 mm)
(7-4) Composite insulation film: polyphenylene sulfide/polyethylene terephthalate/polyphenylene sulfide (thickness: 0.17 mm; with inter-layer adhesive)

TABLE 1

| | Raw material | | Unit | Example 1 | Example 2 | Example 3 | Example 4 |
|---|---|---|---|---|---|---|---|
| Thermosetting resin composition (insulation resin layer) | Solid-form thermosetting resin (A) | (1-1) | Parts by mass | 50 | | | 50 |
| | | (1-2) | Parts by mass | | 60 | | |
| | | (1-3) | Parts by mass | | | 70 | |
| | Liquid-form thermosetting resin (B) | (2-1) | Parts by mass | 50 | | | 50 |
| | | (2-2) | Parts by mass | | 40 | | |
| | | (2-3) | Parts by mass | | | 30 | |
| | Curing agent | (3-1) | Parts by mass | 7 | 8 | | 7 |
| | | (3-2) | Parts by mass | | | | |
| | | (3-3) | Parts by mass | | | 1.5 | |
| | | (3-4) | Parts by mass | | | | |
| | Curing accelerator | (4-1) | Parts by mass | 0.1 | | | 0.1 |
| | | (4-2) | Parts by mass | | 0.3 | | |
| | Thermoplastic resin | (5-1) | Parts by mass | 20 | | | 20 |
| | | (5-2) | Parts by mass | | | 10 | |

TABLE 1-continued

|  |  |  | Example |  |  |  |
|---|---|---|---|---|---|---|
| Raw material |  | Unit | 1 | 2 | 3 | 4 |
| Inorganic filler | (6-1) | Parts by mass | 85 |  |  | 85 |
|  | (6-2) | Parts by mass |  |  |  |  |
|  | (6-3) | Parts by mass |  |  | 100 |  |
|  | (6-4) | Parts by mass |  |  |  | 15 |
| Amount of blended inorganic filler |  | Volume % | 25 | 20 | 5 | 25 |
| Film thickness of insulation resin layer |  | μm | 100 | 50/50 | 75 | 75/75 |
| Insulation resin layer-formed surface |  | — | One surface | Both surfaces | One surface | Both surfaces |
| Base material |  | — | (7-1) | (7-2) | (7-3) | (7-4) |

TABLE 2

|  |  |  |  | Comparative example |  |  |  |
|---|---|---|---|---|---|---|---|
|  | Raw material |  | Unit | 1 | 2 | 3 | 4 |
| Thermosetting resin composition (insulation resin layer) | Solid-form thermosetting resin (A) | (1-1) | Parts by mass | 50 |  |  |  |
|  |  | (1-2) | Parts by mass |  | 60 |  | 60 |
|  |  | (1-3) | Parts by mass |  |  | 70 |  |
|  | Liquid-form thermosetting resin (B) | (2-1) | Parts by mass | 50 |  |  |  |
|  |  | (2-2) | Parts by mass |  | 40 |  | 40 |
|  |  | (2-3) | Parts by mass |  |  | 30 |  |
|  | Curing agent | (3-1) | Parts by mass |  | 8 |  | 8 |
|  |  | (3-2) | Parts by mass | 2 |  |  |  |
|  |  | (3-3) | Parts by mass |  |  |  |  |
|  |  | (3-4) | Parts by mass |  |  | 2 |  |
|  | Curing accelerator | (4-1) | Parts by mass | 0.1 |  |  |  |
|  |  | (4-2) | Parts by mass |  | 0.3 |  | 0.3 |
|  | Thermoplastic resin | (5-1) | Parts by mass | 20 |  |  |  |
|  |  | (5-2) | Parts by mass |  |  | 10 |  |
|  | Inorganic filler | (6-1) | Parts by mass | 85 |  |  |  |
|  |  | (6-2) | Parts by mass |  | 55 |  |  |
|  |  | (6-3) | Parts by mass |  |  |  | 100 |
|  |  | (6-4) | Parts by mass |  |  | 15 |  |
|  | Amount of blended inorganic filler |  | Volume % | 25 | 20 | 5 | 20 |
| Film thickness of insulation resin layer |  |  | μm | 100 | 50/50 | 75 | 50/50 |
| Insulation resin layer-formed surface |  |  | — | One surface | Both surfaces | One surface | Both surfaces |
| Base material |  |  | — | (7-1) | (7-2) | (7-3) | (7-2) |

Insulation sheets of Examples 1-4 were produced according to the raw materials described in the above first and second embodiments and the formulas thereof. Meanwhile, insulation sheets of Comparative examples 1-4 were inappropriate in terms of the formulas of the raw materials thereof, a condition of application to the base material, or the like, and did not conform to the insulation sheet according to the present disclosure. Each of the insulation sheets and the insulation resin layers (before curing treatment) of Examples 1-4 and Comparative examples 1-4 was evaluated for surface smoothness, flexibility, compression rate, adhesiveness, crazing, gelation time, storage shear modulus, loss elastic modulus, loss tangent, and complex viscosity. In addition, the insulation resin layer after curing treatment was evaluated for adhesion strength and dielectric voltage.

The surface smoothness was determined according to whether or not the in-plane distribution of the film thickness of the insulation resin layer fell within ±30% of the average value of the film thickness (○: within ±30%, x: exceeding ±30%). In addition, in order to ascertain the usable time of the insulation sheet, the flexibility and the compression rate thereof were measured immediately after the production and after thirty days of preservation at 40° C. The flexibility was determined according to whether or not a crack or a chip was generated by bending the insulation sheet by 180 degrees at 25° C. (○: not generated, x: generated). Regarding the compression rate, the insulation sheet was disposed on a rolled steel plate, and the compression rate was calculated from reduction in the film thickness at the time of application of a pressure of 25 MPa at 25° C.

Regarding the adhesiveness, the insulation sheet was disposed on a rolled steel plate, and evaluation based on whether or not the insulation sheet was adhered by being pressed under a pressure of 2 MPa at 40° C., was performed immediately after the production and after thirty days of preservation at 40° C. Regarding the adhesiveness, there are a case where it is preferable to have adhesiveness and a case where it is preferable not to have adhesiveness, depending on the purpose of the insulation sheet. Thus, it cannot be said which case is better. However, it is not preferable that there is a difference between the adhesiveness immediately after the production and the adhesiveness after the elapse of thirty days. Therefore, evaluation was made in terms of this point.

Whether or not a crazing phenomenon would occur was checked in order to study influences on coatings of enamel wires. Each of enamel wires (φ1.0 mm) coated with polyester imide/polyamide imide was elongated by 5% and then bent in a U shape, to produce a test piece. The insulation sheet was adhered to the surface of the coating at normal temperature and was separated after 5 minutes. In the case of each of insulation resin layers having no surface tack and unable to be adhered, the insulation sheet was brought into contact with the surface so as to be fixed by means of a clip. After the separation, evaluation based on whether or not a crazing phenomenon occurred was performed through observation with an optical microscope and a pinhole test.

The pinhole test was performed according to JIS C3003. Specifically, the test piece having a prescribed length (about 5 m) was immersed in a saline solution, DC voltage of 12 V was applied for 1 minute with the solution serving as a positive electrode and the test piece serving as a negative electrode, and the number of pinholes having been generated at this time was checked. Furthermore, each of test pieces having been cured under a condition of 150° C. and 1 hour after the adhesion, was observed with the optical microscope to determine whether or not a crack or a pinhole was generated in the surface of the coating. As a result of the pinhole test and the observation, in cases where neither crack nor pinhole was generated and the dielectric breakdown voltage did not decrease, determination of "no crazing" was made, and meanwhile, in cases where generation of a crack or a pinhole was found and the dielectric breakdown voltage decreased, determination of "crazing occurred" was made (○: no crazing, x: crazing occurred).

Regarding the gelation time, the insulation resin layer was collected, and the gelation time thereof at 150° C. was measured by a hot plate method. The softening point was measured according to "Test methods of coating powders for electrical insulation" of JIS C2161. The storage shear modulus, the loss elastic modulus, the loss tangent, and the complex viscosity, were measured by evaluation of dynamic viscoelasticity when the temperature was increased from normal temperature at a temperature increase rate of 5° C./minute with a parallel plate jig by using each insulation resin layer having a film thickness of 100 μm to 300 μm.

Regarding the adhesion strength, adhesion test pieces were prepared, and evaluation was performed with a tensile testing machine. Each adhesion test piece was prepared by pressing the insulation sheet to an electromagnetic steel plate, which had been subjected to surface treatment of acetone degreasing, and performing curing for 1 hour at 150° C. A tensile test was performed at 25° C. under a condition of a peeling angle of 180 degrees and a tensile speed of 10 mm/min. Evaluation was made according to the following determination criteria (○: adhesion strength not less than 10 N/m, x: adhesion strength less than 10 N/m).

Regarding the dielectric voltage, each insulation resin layer was adhered on a steel plate piece side and cured at 150° C. for 1 hour, to prepare a test piece. Then, voltage was applied in oil to the test piece at a fixed voltage increase rate of 0.5 kV/second by using an insulation breakdown tester, whereby a dielectric breakdown voltage was measured and was evaluated according to the following determination criteria (○: dielectric breakdown voltage not less than 8 kV, x: dielectric breakdown voltage less than 8 kV).

Evaluation results of the insulation sheets and the insulation resin layers of Examples 1-4 are indicated in Table 3, and evaluation results of the insulation sheets and the insulation resin layers of Comparative examples 1-4 are indicated in Table 4.

TABLE 3

| | | | | Example | | | |
|---|---|---|---|---|---|---|---|
| | Item | Condition | Unit | 1 | 2 | 3 | 4 |
| Properties of insulation sheet | Surface smoothness | — | — | ○ | ○ | ○ | ○ |
| | Flexibility | Immediately after production | — | ○ | ○ | ○ | ○ |
| | | After elapse of thirty days | — | ○ | ○ | ○ | ○ |
| | Compression rate | Immediately after production | % | 30 | 25 | 45 | 20 |
| | | After elapse of thirty days | % | 30 | 25 | 45 | 20 |
| | Adhesiveness | Immediately after production | — | Adhesive | Not adhesive | Adhesive | Not adhesive |
| | | After elapse of thirty days | — | Adhesive | Not adhesive | Adhesive | Not adhesive |
| | Crazing | 25° C. | — | ○ | ○ | ○ | ○ |

TABLE 3-continued

|  | Item | Condition | Unit | Example 1 | Example 2 | Example 3 | Example 4 |
|---|---|---|---|---|---|---|---|
| Properties of insulation resin layer | Non-volatile content | 0 | % | 98.7 | 99.0 | 99.3 | 99.9 |
|  | Gelation time | 150° C. | Min. | 4 | 3 | 5 | 3.5 |
|  | Storage shear modulus (G') | 25° C. | Pa | 7000 | 10300 | 5000 | 8000 |
|  | Minimum value of G' (temperature) | — | Pa | 290 (115° C.) | 452 (125° C.) | 225 (130° C.) | 290 (115° C.) |
|  | Loss elastic modulus (G") | 25° C. | Pa | 7800 | 11200 | 5500 | 9200 |
|  | Minimum value of G" (temperature) | — | Pa | 390 (120° C.) | 512 (129° C.) | 245 (133° C.) | 390 (120° C.) |
|  | Local maximum value of loss tangent (tanδ) | In range of 90° C. to 150° C. | — | 2.9 | 2.3 | 3.1 | 1.8 |
|  | Complex viscosity | 25° C. | Pa · s | 1800 | 2800 | 850 | 5000 |
|  | Minimum complex viscosity (temperature) | — | Pa · s | 90 (118° C.) | 50 (125° C.) | 323 (128° C.) | 260 (118° C.) |
| Properties after curing | Adhesion strength | 25° C. | N/m | ○ | ○ | ○ | ○ |
|  | Dielectric voltage | 25° C. | kV | ○ | ○ | ○ | ○ |

TABLE 4

|  | Item | Condition | Unit | Comparative example 1 | Comparative example 2 | Comparative example 3 | Comparative example 4 |
|---|---|---|---|---|---|---|---|
| Properties of insulation sheet | Surface smoothness | — | — | ○ | x | ○ | ○ |
|  | Flexibility | Immediately after production | — | ○ | ○ | ○ | x |
|  |  | After elapse of thirty days | — | x | ○ | x | x |
|  | Compression rate | Immediately after production | % | 30 | 25 | 45 | 3 |
|  |  | After elapse of thirty days | % | 1 | 25 | 2 | 3 |
|  | Adhesiveness | Immediately after production | — | Adhesive | Not adhesive | Adhesive | Not adhesive |
|  |  | After elapse of thirty days | — | Not adhesive | Not adhesive | Not adhesive | Not adhesive |
|  | Crazing | 25° C. | — | ○ | ○ | ○ | ○ |
| Properties of insulation resin layer | Non-volatile content |  | % | 98.7 | 99.0 | 99.3 | 100 |
|  | Gelation time | 150° C. | Min. | 0.3 | 3.5 | 0.1 | Unable to measure |
|  | Storage shear modulus (G') | 25° C. | Pa | 7300 | 12000 | 8000 | 150000 |
|  | Minimum value of G' (temperature) | — | Pa | 1345 (50° C.) | 398 (125° C.) | 3200 (45° C.) | N/A |
|  | Loss elastic modulus (G") | 25° C. | Pa | 8500 | 14400 | 9200 | 200000 |
|  | Minimum value of G" (temperature) | — | Pa | 2132 (53° C.) | 423 (128° C.) | 3783 (48° C.) | N/A |
|  | Local maximum value of loss tangent (tanδ) | In range of 90° C. to 150° C. | — | — | 2.4 | — | N/A |
|  | Complex viscosity | 25° C. | Pa · s | 2300 | 2900 | 4500 | 56000 |
|  | Minimum complex viscosity (temperature) | — | Pa · s | 70 (140° C.) | 90 (126° C.) | 150 (74° C.) | N/A |

TABLE 4-continued

|  | Item | Condition | Unit | Comparative example | | | |
|---|---|---|---|---|---|---|---|
|  |  |  |  | 1 | 2 | 3 | 4 |
| Properties after curing | Adhesion strength | 25° C. | N/m | x | x | x | x |
|  | Dielectric voltage | 25° C. | kV | ○ | ○ | ○ | ○ |

The insulation sheet of each of Examples 1-4 has excellent properties of flexibility and viscoelasticity, and has a compression rate not lower than 10%. Thus, when the insulation sheet is disposed in a gap between a stator core and a coil of a rotary electric machine, the film thickness is reduced by pressure at the time of forming the stator core into an annular shape, and the insulation resin layer can flow at the time of heating to permeate a narrow space in the gap. In addition, no difference in flexibility and compression rate is generated after thirty days of preservation at 40° C. Thus, at normal temperature, the progress of a reaction is slow, and the usable time is long. In addition, high adhesion strength and high dielectric voltage were obtained for the insulation sheet of each example.

In contrast, Comparative examples 1-4 are inappropriate in terms of the formulas of the raw materials thereof, a condition of application to the base material, or the like, and thus desired insulation sheet properties cannot be obtained. The formula of Comparative example 1 is different from the formula of Example 1 in that Comparative example 1 contains the curing agent reactive at normal temperature. The formula of Comparative example 3 is different from the formula of Example 3 in that Comparative example 3 contains the curing agent having a 10-hour half-life temperature of 32.7° C. In the insulation sheet of each of Comparative example 1 and Comparative example 3, a reaction progresses at normal temperature in a state where the insulation sheet is left at rest so that the physical properties of the insulation resin layer change over time, whereby a problem arises in terms of usable time. After the elapse of thirty days, the flexibility and the adhesiveness are lost, and the compression rate sharply decreases. Since the insulation resin layer is cured at low temperature, the fluidity at the time of curing due to heating is low so that permeability into a minute gap is not obtained, whereby the insulation resin layer is inferior in the force of adhesion to a member. In addition, a crack and separation occur on the insulation resin layer by bending, whereby workability becomes poor.

The formula of Comparative example 2 is different from the formula of Example 2 in that Comparative example 2 contains the inorganic filler having a maximum particle diameter of 150 μm and an average particle diameter of 100 μm. Comparative example 2 is an insulation sheet in which an insulation resin layer having a film thickness of 50 μm is formed on each of both surfaces of a base material having a film thickness of 100 μm, the total thickness of the insulation sheet being 200 μm. Since the average particle diameter of the inorganic filler is larger than the film thickness of the insulation resin layer, the surface unevenness of the insulation resin layer is great, and the surface smoothness thereof is low. Therefore, the insulation sheet of Comparative example 2 cannot be inserted in a gap (220 μm) between a stator core and a coil. In addition, the insulation sheet is inferior in adhesion between the stator core and the coil, and a desired adhesion strength cannot be obtained.

In Comparative example 4, the same thermosetting resin composition and the same base material as those in Example 2 were used. However, drying after applying the thermosetting resin composition onto the base material was excessively performed. Thus, the insulation resin layer was nearly in a completely cured state and did not have flexibility. Therefore, the compression rate of the insulation sheet is very low, and the insulation resin layer suffers a crack and is separated when being bent, whereby workability becomes poor. As described above, in Examples 1-4, favorable results were obtained for all the evaluation items, but Comparative examples 1-4 were found to be inferior in some of the evaluation items.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. An insulation sheet comprising (i) one or each of an insulation paper sheet and an insulation film as a base material, and (ii) an insulation resin layer made of a thermosetting resin composition in an uncured or semi-cured state formed on one or each of both surfaces of the base material, the thermosetting resin composition containing:
   a thermosetting resin (A) that is in solid form at 25° C.;
   a thermosetting resin (B) that is in liquid form at 25° C.;
   a latent curing agent that is unreactive at 60° C. or lower; and
   an inorganic filler having a maximum particle diameter smaller than a film thickness of the insulation resin layer and having an average particle diameter smaller than 0.5 times the film thickness, wherein
   an amount of the thermosetting resin (A) per a total of 100 parts by mass of the thermosetting resin (A) and the thermosetting resin (B) is in a range of 30 parts by mass to 70 parts by mass, and
   the insulation sheet has a film thickness which is reduced through compression by at least 10% under a pressure of 25 MPa at 25° C.,
   wherein the insulation sheet satisfies at least one of:
   (A) the insulation resin layer has, at 25° C., a storage shear modulus that is in a range of $1.0 \times 10^3$ Pa to $5.0 \times 10^4$ Pa, and a smallest value of the storage shear modulus is present in a range of 80° C. to 150° C. and is in a range of 10 Pa to $2.0\times10^3$ Pa, or (B) the insulation resin layer has, at 25° C., a complex viscosity that is in a range of $6.0\times10^2$ Pa·s to $1.0\times10^4$ Pas, and a smallest value of the complex viscosity is present in a range of 80° C. to 150° C. and is not greater than $5.0\times10^2$ Pa·s.

2. The insulation sheet according to claim 1, wherein the insulation paper sheet is any of an aramid paper sheet, a kraft paper sheet, and a crepe paper sheet.

3. The insulation sheet according to claim 1, wherein the insulation film is made of an engineering plastic or a super engineering plastic.

4. The insulation sheet according to claim 3, wherein the insulation film is made of a polyester, polyphenylene sulfide, polyether ether ketone, or a polyimide.

5. The insulation sheet according to claim 1, wherein one or both of the insulation paper sheet and the insulation film are stacked to form a stack of base materials, and the insulation resin layer is formed on one or both ends of the stack.

6. The insulation sheet according to claim 1, wherein
a plurality of the base materials are stacked with the insulation resin layer or an adhesive therebetween, and the insulation resin layer is formed on a base material that is at one or each of both ends among the base materials.

7. The insulation sheet according to claim 1, wherein each of the thermosetting resin (A) and the thermosetting resin (B) contains at least one of an epoxy resin, a phenolic resin, and an unsaturated polyester resin.

8. The insulation sheet according to claim 1, wherein the thermosetting resin (A) is an epoxy resin having a softening point that is in a range of 50° C. to 160° C.

9. The insulation sheet according to claim 1, wherein the latent curing agent is any of a boron trifluoride-amine complex, dicyandiamide, and an organic acid hydrazide.

10. The insulation sheet according to claim 1, wherein
the thermosetting resin composition further contains a thermoplastic resin having a weight average molecular weight that is in a range of 10,000 to 100,000, and
an amount of the thermoplastic resin per a total of 100 parts by mass of the thermosetting resin (A) and the thermosetting resin (B) is in a range of 1 part by mass to 40 parts by mass.

11. The insulation sheet according to claim 1, wherein a non-volatile content of the insulation resin layer per a total of 100 parts by mass of the thermosetting resin composition is not less than 97 parts by mass.

12. The insulation sheet according to claim 1, wherein
the insulation resin layer has, at 25° C., a storage shear modulus that is in a range of $1.0\times10^3$ Pa to $5.0\times10^4$ Pa, and
a smallest value of the storage shear modulus is present in a range of 80° C. to 150° C. and is in a range of 10 Pa to $2.0\times10^3$ Pa.

13. The insulation sheet according to claim 1, wherein
the insulation resin layer has, at 25° C., a complex viscosity that is in a range of $6.0\times10^2$ Pa·s to $1.0\times10^4$ Pa·s, and
a smallest value of the complex viscosity is present in a range of 80° C. to 150° C. and is not greater than $5.0\times10^2$ Pa·s.

14. A rotary electric machine comprising members to be insulated and a gap between the members to be insulated, wherein the insulation sheet according to claim 1 is inserted in the gap between the members to be insulated, wherein the film thickness of the insulation resin layer is set to fall in a range of 1.1 times to 2.0 times a dimension that is obtained by subtracting a thickness of the base material from a dimension of the gap between the members to be insulated.

15. A rotary electric machine in which the insulation sheet according to claim 1 is used, and a stator coil is accommodated in a slot of a stator core, wherein
the insulation sheet in a state where the thermosetting resin composition forming the insulation resin layer is cured, is disposed between the stator coil and an inner wall of the slot so as to insulate and fix the stator core and the stator coil.

16. The rotary electric machine according to claim 15, wherein a force of adhesion of the insulation resin layer to the stator core and the stator coil is not less than 20 N/m.

* * * * *